(12) United States Patent
Atkinson

(10) Patent No.: US 7,050,756 B2
(45) Date of Patent: May 23, 2006

(54) PHONE ENABLED DIRECT RESPONSE

(75) Inventor: Paul Atkinson, Poway, CA (US)

(73) Assignee: Kestrel Wireless, Inc., Poway, CA (US)

( * ) Notice: Subject to any disclaimer, the term of this patent is extended or adjusted under 35 U.S.C. 154(b) by 249 days.

(21) Appl. No.: 10/645,452

(22) Filed: Aug. 21, 2003

(65) Prior Publication Data

US 2004/0048637 A1 Mar. 11, 2004

Related U.S. Application Data

(60) Provisional application No. 60/407,047, filed on Aug. 29, 2002.

(51) Int. Cl.
*H04H 9/00* (2006.01)
(52) U.S. Cl. ............ 455/2.01; 455/411; 455/423; 455/410
(58) Field of Classification Search ......... 455/410, 455/411, 412.2, 413, 418, 422.1, 423, 436, 455/2.01
See application file for complete search history.

(56) References Cited

U.S. PATENT DOCUMENTS 5,712,638 A * 1/1998 Issa .................. 341/176
5,839,050 A * 11/1998 Baehr et al. ............... 455/2.01
5,859,879 A * 1/1999 Bolgiano et al. ........... 455/101
6,141,531 A * 10/2000 Williams et al. ............... 455/7
6,351,652 B1 * 2/2002 Finn et al. ................ 455/552.1
6,384,710 B1 * 5/2002 LeMense et al. ............. 455/133
6,389,055 B1 * 5/2002 August et al. ............... 375/130
6,542,735 B1 * 4/2003 Carley ...................... 455/420
2002/0072325 A1 * 6/2002 Hayter et al. .............. 455/2.01
2003/0108007 A1 * 6/2003 Holcman et al. ........... 455/436

* cited by examiner

*Primary Examiner*—Temica Beamer
*Assistant Examiner*—Huy D. Nguyen
(74) *Attorney, Agent, or Firm*—Robert J. Rose; Sheldon & Mak PC

(57) ABSTRACT

An acoustic transmission is retransmitted by telephone to a network operations center over one path. The network operations center receives acoustic transmissions containing inaudible marks from other sources over secondary paths. The retransmitted acoustic transmission and secondary transmissions are processed and compared to determine a best match between the retransmitted acoustic transmission and one of the secondary transmissions. An acoustic mark in the best match secondary transmission is decoded and associated with the retransmitted acoustic transmission. This association in combination with decision rules stored at the operations center may be used to trigger a variety of transactions with the user.

52 Claims, 2 Drawing Sheets

PHONE ENABLED DIRECT RESPONSE

RELATED APPLICATIONS

This application claims priority in U.S. provisional application Ser. No. 60/407,047, filed on Aug. 29, 2002.

FIELD OF THE INVENTION

The present invention relates to a system and method for phone enabled direct response, and more particularly relates to a system and method for identifying a retransmitted acoustic transmission by comparing it with acoustic transmissions received from a secondary source.

BACKGROUND OF THE INVENTION

There are many applications that require the ability to identify the specific media and/or its source that is being broadcast or is playing at a consumer's immediate point-of-presence (POP), such as a home or office, car, store, stadium, theater and so on. Examples of such applications include direct-response advertisements, promotions, fundraising campaigns, interactive entertainment, information and public services. The attractiveness of these applications to consumers and businesses is directly related to the ease and speed with which the media and/or its source can be identified and the consumer is connected to an appropriate entity (advertiser, broadcaster, media company etc.).

Because of its ubiquity, familiarity and ease of use the phone is a natural vehicle for enabling such activities. By "listening" through the consumer's phone it is possible to identify the media playing at the POP and take appropriate action. Existing telephonic techniques for identifying media at the POP have required either direct user input, decoding embedded 'marks' in the media or matching the media's acoustic signature with previously stored signatures. In practice these techniques have proven to be too complex or too slow to gain acceptance. The problem is largely due the adverse impact of the phone and phone network on the quality of the signal retransmitted from the POP to the appropriate processing authority.

SUMMARY OF THE INVENTION

The present invention provides a method and system that circumvents the adverse effects of phones and telecommunications networks on works and acoustic marks encoded within acoustic transmissions retransmitted through phones. A method is provided for identifying the retransmitted acoustic transmission by matching it to the same, but "clean", transmission received over a second path. Acoustic marks encoded in the acoustic transmission received over the second path may also be associated with the retransmitted acoustic transmission.

Accordingly, one embodiment of the invention is a method wherein a first acoustic transmission is received from a phone, a secondary acoustic transmission is received over a secondary path, and the first acoustic transmission is matched to the second acoustic transmission.

Another embodiment of the invention is a method wherein an audible acoustic transmission is received over a first path, and the same acoustic transmission is received over a second path. An acoustic mark encoded in the transmission received over the second path is associated with the acoustic transmission received over the first path.

In another embodiment of the invention, an audible acoustic transmission is received by retransmission from a user's telephone and compared with audible acoustic transmissions received over a second path. The retransmitted audible acoustic transmission is matched with one of the audible acoustic transmissions received over the second path, and a transaction is initiated based on the match.

Another embodiment of the invention is identifying a retransmitted acoustic transmission by comparing it with acoustic transmissions received from a secondary source.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
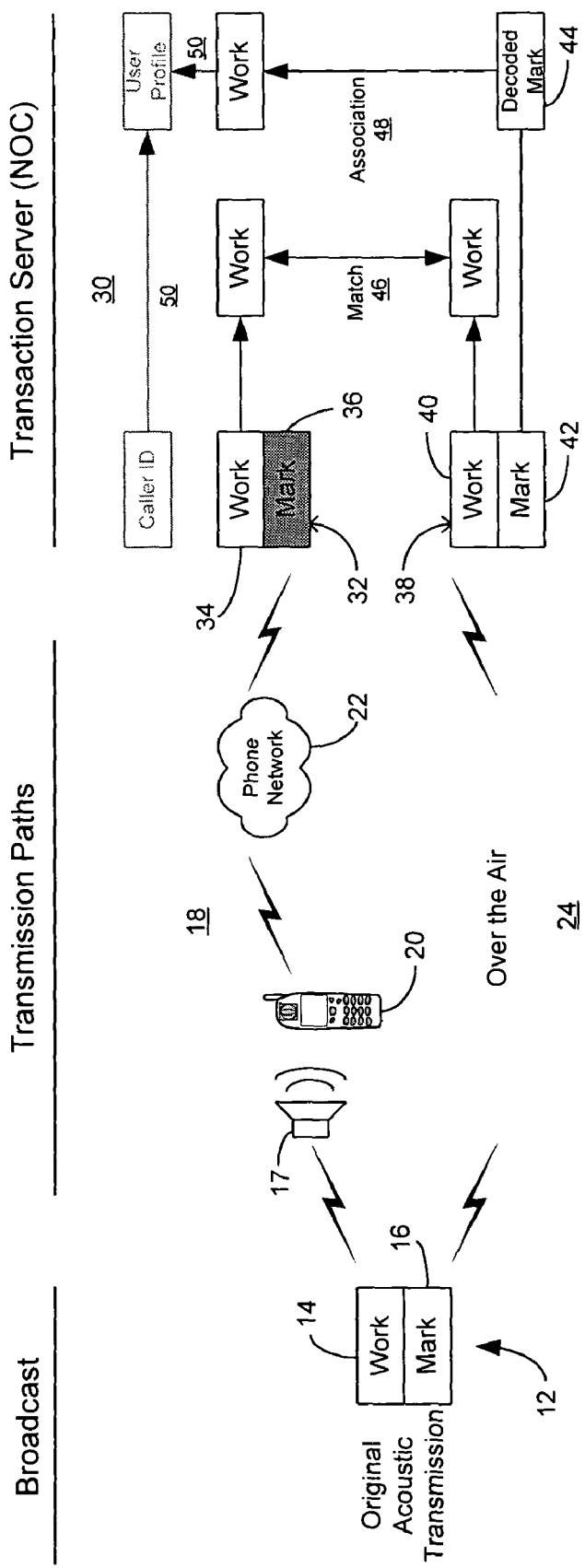
FIG. 1 is a block diagram of a system according to the present invention.

A system 10 according to the present invention is illustrated in FIG. 1. System 10 circumvents the adverse effects of phones and telecommunications networks on works and inaudible acoustic marks encoded within acoustic transmissions retransmitted through phones. An acoustic transmission that is retransmitted by the user's phone is identified by comparing it with acoustic transmissions received via a secondary path. Acoustic marks encoded in the acoustic transmissions received over the secondary path are associated with the same acoustic transmission received via retransmission by a user's phone.

An original acoustic transmission 12 is generated from any number of sources including, for example, radio and television broadcasts, public address systems and media players for media such as CDs, DVDs, video and audio tapes. Acoustic transmission 12 includes a work 14 and an acoustic mark 16. Mark 16 is typically inaudible, wherein the term "inaudible" refers to near-inaudible as well as inaudible signals. Under some circumstances, however, mark 16 might be audible. An example of an audible mark is an emergency broadcast tone or announcement. Mark 16 may be related or unrelated to work 14. Mark 16 may be, for example, a watermark that is specific to work 14 and remains with work 14 for its lifetime. Examples of works that may contain such marks include music, advertisements, news stories/features, announcements, television programs, movies, etc.

Figure 2:
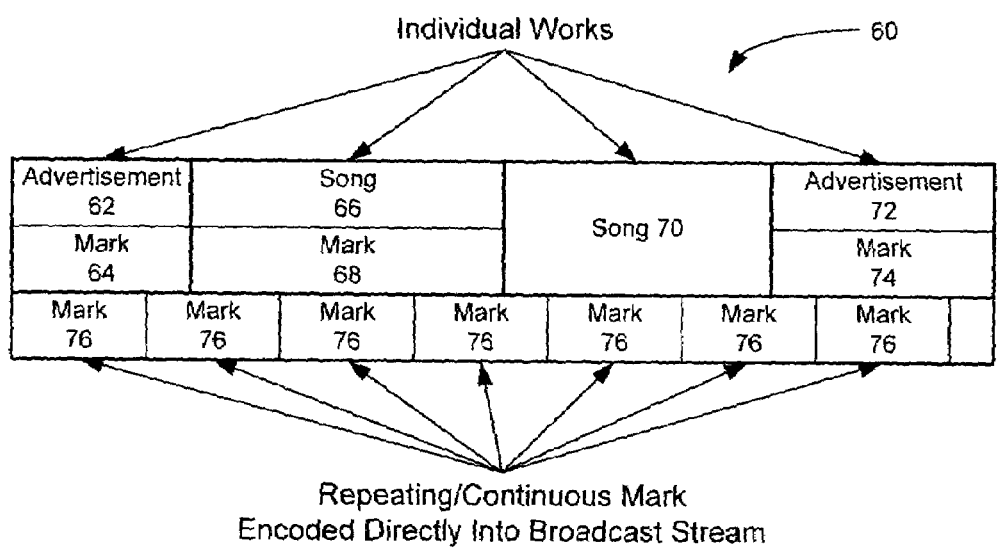
FIG. 2 is a block diagram illustrating an acoustic transmission with encoded marks according to the present invention.

As depicted in FIG. 2, a mark may be encoded within a specific work (i.e. a particular advertisement or song) and/or within an acoustic transmission containing multiple works (i.e. a radio or television broadcast, or a CD or DVD containing numerous works). Acoustic transmission 60 of FIG. 2 contains multiple works, each of which may or may not have its own mark: advertisement 62 is encoded with mark 64; song 66 is encoded with a mark 68; song 70 has no mark; and advertisement 72 is encoded with mark 74. The individual marks associated with the individual works may be encoded, for example, during the production of the work (e.g. post production or optical media mastering/replication). Additionally (or alternatively), transmission 60 includes a mark 76 encoded directly into the broadcast stream and spanning all of the individual works. As depicted, mark 76 is typically a repeating/continuous mark (such as a station ID) encoded directly into the broadcast stream at the station, uplink, cable head-end or other location.

Referring again to FIG. 1, original acoustic transmission 12 is transmitted over separate paths 18 and 24 to a transaction server or Network Operation Center (NOC) 30. Path 18 comprises retransmission by a user's phone 20 of original acoustic transmission 12 over a communications network 22 to NOC 30. The term "phone" is intended broadly and refers to any device capable of receiving audio and communicating over a telecommunications network. Examples include cellular phones, portable phones, plain old telephone systems (POTS), personal digital assistants (PDAs) enhanced with telecom or wireless LAN connections such as 802.11x and Bluetooth, and so on. Additionally, while the methods herein are described as occurring in a single facility (the "NOC"), it should be understood that the method and system components may be integrated or distributed amongst various equipment configurations and locations.

In one implementation, while acoustic transmission 12 is being transmitted within his hearing by, for example, a speaker 17, the user calls NOC 30 using phone 20. Acoustic transmission 12 may be, for example, a radio or television broadcast that is picked up by the microphone of phone 20 and retransmitted to NOC 30 when the user calls NOC 30. The user's voice and other ambient noise in the user's presence will also be transmitted along path 18 to NOC 30.

Hence, NOC 30 receives a first acoustic transmission 32 via path 18 comprising original acoustic transmission 12 as retransmitted by phone 20, along with the user's voice and other ambient noise. NOC 30 may receive transmission 32 by any of the well known ways of answering a voice call. Phone 20 may retransmit acoustic transmission 14 in the same way it transmits a voice call, or it may pre-process acoustic transmission 14 and then transmit a processed variant to NOC 40. In the latter scenario, NOC 40 may handle acoustic transmission 32 as either a voice call or a data communication.

First acoustic transmission 32 comprises work 34 and acoustic mark 36 (retransmitted versions of work 14 and mark 16). As shown in FIG. 1, mark 36 may be of degraded or lower quality due to signal degradation, ambient noise, etc. that occurs during retransmission over path 18.

Original acoustic transmission 12 is also transmitted to NOC 30 via a secondary communication path 24. Path 24 may comprise, without limitation, an over-the-air radio or TV terrestrial broadcast, cable or satellite, Internet, T1 and frame relay. Hence, NOC 30 receives a second acoustic transmission 40 comprising original acoustic transmission 12 as transmitted over secondary path 24. Acoustic transmission 40 from secondary path 24 is received simultaneously, near simultaneously or temporally offset (before or after) with acoustic transmission 32 from path 18.

Second acoustic transmission 38 comprises work 40 and acoustic mark 42 (directly transmitted versions of work 14 and mark 16). Since it is directly transmitted, mark 42 is "clean" and is typically of much higher quality than the mark 36 received by retransmission.

NOC 30 correlates or matches (line 46) the work portion 34 of acoustic transmission 32 received from phone 20 with the work portion 40 of acoustic transmission 38 received via secondary path 24. This matching or correlation process 46 may use well-known processes such as time-frequency correlation or feature matching, and may be performed in software or hardware. Acoustic transmission 38 may be filtered through a phone or other hardware or software filter (i.e. a vocoder emulator) as part of the process. In one embodiment, match 46 is a "simple match" between acoustic transmission 32 from phone 20 and acoustic transmission 38 from secondary path 24.

In another embodiment, match 46 is a "best match" between acoustic transmission 32 received from phone 20 and multiple and different acoustic transmissions 38 received via secondary paths 24. NOC 30, for example, may receive multiple acoustic transmissions 38 from all radio stations playing within the user's area. When a transmission 32 is received that comprises a radio station playing within the user's listening range and retransmitted by phone 20 to NOC 30, transmission 32 is correlated to the "best match" among all transmitting radio stations (as embodied in transmissions 38).

In certain instances, the number of different acoustic transmissions 38 being matched to transmission 32 from phone 20 may be minimized. Information about the user's location and the corresponding acoustic transmissions originating in that area, for example, may be used to reduce the number of potentially matching transmissions. Information about the user's location may be derived from, for example, GPS coordinates, E911 data, caller ID data, cell sites and previously stored user profiles. The phone number used to call NOC 30 may also be used to minimize the number of potential matching acoustic transmissions 38. Particular call-in numbers, for example, may be associated with particular locations or particular transmission types or sources (e.g., radio broadcasts, sports broadcasts, television broadcasts).

Although mark 36 received by retransmission over path 18 is typically damaged or degraded relative to mark 42 received over secondary path 24, it will still likely embody information that may be of use in the matching process. Hence, a useable portion of mark 36 in combination with work 34 may be used to find a match with a mark and work received over the "clean" path 24.

Once a match 46 has been obtained, any marks 42 that are encoded within the matching transmission 38 are decoded to produce a decoded mark 44 that is associated (line 48) with the acoustic transmission 32 received from the user's phone. The marks encoded within acoustic transmissions received over direct path 24 are "clean" and not adversely affected, as may be marks encoded within acoustic transmissions received over retransmission path 18. This decoding process may use any of the well-established techniques consistent with the method of encoding the marks within the acoustic transmission. Association 48 may be executed as a real-time transaction or in a database. Association 48 may be extended to include dependent links 50 to information such as the user's phone number (caller ID), a previously stored profile (personal information and preferences), user inputs (e.g. personal identification number, promotion code, etc.) via the user's phone (keypad, touch screen, stylus, voice recognition, etc.), other marks, the acoustic transmission and its source. Association 48 may be used to trigger a variety of transactions such as, for example, sending a voice response to the user, or sending an email to the user using previously stored personal information linked to the caller ID. Other transactions that might be triggered include posting a link or other information to a website, or routing the call to a third party.

Any or all of the acoustic transmissions received by NOC 30, processed transmissions and decoded marks may be stored in memory at NOC 30 and processed at different times. Hence, the matching and association processes 46 and 48 may be initiated and/or completed some time after the user has terminated the call.

EXAMPLE 1

Figure 3:
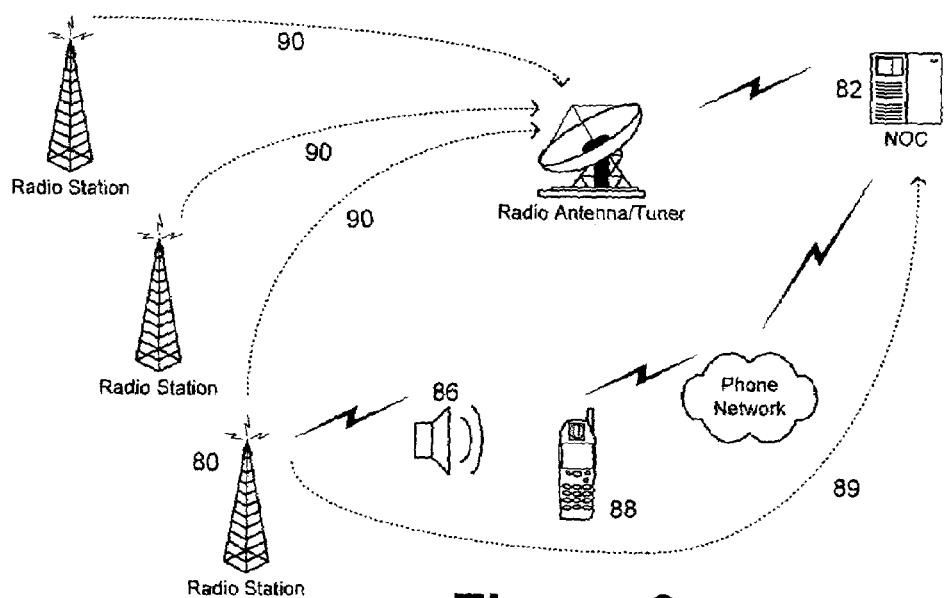
FIG. 3 is a block diagram of an example implementation of the present invention.

One application of the present invention is shown in FIG. 3. An advertisement containing an inaudible mark is broadcast by a local radio station 80. The mark contains a unique number or ID that identifies that specific advertisement. A NOC 82 has radio tuners 84 tuned to each of the twenty radio stations broadcasting in a user's general vicinity. While listening to his car radio 86, the user calls NOC 82 using his cell phone 88. NOC 82 signal processes the acoustic transmission from the user's car radio 86 that is being retransmitted by the user's phone 88 over path 89.

Concurrently, NOC 82 receives each of the twenty available radio broadcasts via over-the-air paths 90 and decodes the inaudible marks encoded within those broadcasts. Because these acoustic transmissions are not retransmitted by phones, the marks encoded within those transmissions are not adversely affected by the phone (vocoder) or the phone network. NOC 82 compares the acoustic transmission (the audio advertisement) retransmitted by phone 88 over path 89 to the twenty other radio broadcasts (with the encoded marks unaffected) it receives via over-the-air paths 90 and performs a "best match". When a best match is found, NOC 82 associates the ID (decoded mark) from the matched over-the-air broadcast with the acoustic transmission received from the user's phone 88.

After match and mark association is complete, NOC 82 executes a transaction in accordance with previously stored decision rules. For example, NOC 82 may play a specific message to users who call during, or within five minutes of, the advertisement. Hence, in short, a user calls the NOC while listening to an advertisement or promotion on the radio. The NOC determines which station the user is listening to and uses the ID associated with that station near the time of the user's call and a previously stored decision rule to select and play the appropriate recorded voice message to the user.

EXAMPLE 2

A user is watching a documentary on cable TV in his living room. He calls the NOC with his portable phone and is identified by caller ID and a previously stored profile. The audio track from the television broadcast (documentary) is retransmitted by the user's phone to the NOC. The NOC correlates it to one of 200 channels available in the user's area, as determined by the area code in the user's caller ID. Alternatively, the channels available in the user's area might be determined by referencing a previously registered user profile indicating the user's cable provider. The documentary has recurring marks encoded throughout the show that identify each segment (see, e.g., FIG. 2). In response to a voice menu provided by the NOC, the user selects a "bookmark" option by pressing 1 on his keypad. The NOC automatically sends an email containing additional programming and promotions directly to the user's email address as contained in the user's profile. Different emails may be sent depending on which segment was on air when the user called (as determined by the matching and association process).

While various embodiments of the invention have been described, it will be apparent to those of ordinary skill in the art that many more embodiments and implementations are possible that are within the scope of this invention.

What is claimed is:

1. A method comprising:
    receiving a first acoustic transmission from a phone over a first path;
    receiving a secondary acoustic transmission over a secondary path, the first and second acoustic transmissions originating from an audio source signal which includes audible content;
    matching the first acoustic transmission to the second acoustic transmission, wherein multiple secondary acoustic transmissions are received and processed to identify a match between the first acoustic transmission and one of the secondary acoustic transmissions; and wherein the number of secondary acoustic transmissions processed to identify the match is reduced by using at least one of: a phone number associated with the phone, information related to a user of the phone, a call-in number used by the user of the phone, and other information provided by the user of the phone.

2. A method as claimed in claim 1, further comprising:
    decoding a mark contained within the second acoustic transmission; and
    associating the mark with the first acoustic transmission.

3. A method as claimed in claim 2, wherein associating the mark and first acoustic transmission further includes using information relating to a user of the phone to perform the association between the mark and the first acoustic transmission.

4. A method as claimed in claim 3, wherein the information is selected from a group comprising the user's telephone number, a stored user profile, user phone inputs, other marks and the source of the acoustic transmission.

5. A method as claimed in claim 2, wherein the association between the mark and the first acoustic transmission triggers another transaction.

6. A method as claimed in claim 5, wherein the transaction is sending a voice response to the user.

7. A method as claimed in claim 5, wherein the transaction is sending an email to the user.

8. The method of claim 2 further comprising:
    initiating a transaction based on the mark.

9. The method of claim 2 wherein the mark is associated with the audible content.

10. The method of claim 2 wherein the mark is associated with the source of the audio source signal.

11. The method of claim 2 wherein the mark is an inaudible mark.

12. A method as claimed in claim 1, wherein the first and second acoustic transmissions comprise an audio radio broadcast content.

13. A method as claimed in claim 1, wherein the first and second acoustic transmissions comprise a television broadcast content.

14. A method as claimed in claim 1, wherein the secondary path is selected from a group comprising an over-the air radio broadcast, a television terrestrial broadcast, cable, satellite, Internet, T1 and frame relay.

15. The method of claim 1 further comprising:
    initiating a transaction based on the match.

16. The method of claim 1 wherein the received first acoustic transmission is a degraded version of the secondary acoustic transmission.

17. The method of claim 1, wherein the secondary path is a wireless communication link.

18. The method of claim 1, wherein the secondary path is a wired communication link.

19. The method of claim 1 wherein matching the first acoustic transmission to the second acoustic transmission includes matching the audible content of the first acoustic transmission to the audible content of the secondary acoustic transmission.

20. The method of claim 19 wherein matching the first acoustic transmission to the second acoustic transmission includes matching a mark in the first acoustic transmission to a mark in the secondary acoustic transmission.

21. The method of claim 19 wherein the audio content includes at least portions of an advertisement.

22. The method of claim 21 wherein a mark in the second acoustic transmission is associated with the advertisement.

23. The method of claim 19 wherein the audio content includes at least portions of a song.

24. A method comprising:
receiving a first audio transmission over a first path;
receiving a second audio transmission over a second path, the first and second audio transmissions originating from an audio source signal which includes audible content; and
associating a mark encoded in the second audio transmission received over the second path with the first audio transmission received over the first path, wherein the second acoustic transmission is one of multiple secondary acoustic transmissions received and processed to identify a match between the first audio transmission and the second audio transmission; and reducing the potential number of secondary audio transmissions by using at least one of: a phone number associated with the phone, information related to a user of the phone, a call-in number used by the user of the phone, and other information provided by the user of the phone.

25. A method comprising:
identifying a first acoustic transmission by comparing it with other acoustic transmissions from a phone received from a secondary source, the first acoustic transmission and other acoustic transmissions originating from audio source signals which includes audible content; reducing the potential number of said other acoustic transmissions by using at least one of: a phone number associated with the phone, information related to a user of the phone, a call-in number used by the user of the phone, and other information provided by the user of the phone.

26. The method of claim 25 wherein the comparison of the first acoustic transmission and other acoustic transmissions includes comparing a portion of the audible content of the first acoustic transmission to portions of audible content in the other acoustic transmissions.

27. An apparatus comprising:
a first communication interface to receive a first acoustic transmission from a phone;
a second communication interface to receive a secondary acoustic transmission over a secondary path, the first and second acoustic transmissions originating from an audio source signal which includes audible content; and
a processing unit configured to match the first acoustic transmission to the second acoustic transmission; wherein the second acoustic transmission is one of multiple secondary acoustic transmissions received and processed to identify a match between the first acoustic transmission and the second acoustic transmission; and reduce the potential number of other secondary acoustic transmissions by using at least one of: a phone number associated with the phone, information related to a user of the phone, a call-in number used by the user of the phone, and other information provided by the user of the phone.

28. The apparatus of claim 27 wherein the processing unit is further configured to decode a mark contained within the secondary acoustic transmission; and
associate the mark of the secondary acoustic transmission with the first acoustic transmission.

29. The apparatus of claim 27 wherein multiple secondary acoustic transmissions are received and processed to identify a match between the first acoustic transmission and one of the secondary acoustic transmissions.

30. A transaction server comprising:
means for receiving a first acoustic transmission from a phone over a first path;
means for receiving a second acoustic transmission over a secondary path, the first and second acoustic transmissions originating from a source signal which includes audio content; and
means for matching the first acoustic transmission to the second acoustic transmission, wherein the second acoustic transmission is one of multiple secondary transmissions received and processed to identify a match between the first acoustic transmission and one of the secondary acoustic transmissions; and means for reducing the potential number of secondary acoustic transmissions by using at least one of: a phone number associated with the phone, information related to a user of the phone, a call-in number used by the user of the phone, and other information provided by the user of the phone.

31. A machine-readable medium comprising instructions executable by a processor for matching a first audio signal to a second audio signal to identify the first audio signal, which when executed by a processor, causes the processor to perform operations comprising:
receive a first acoustic transmission from a user's telephone over a first path;
compare the first acoustic transmission with other audible acoustic transmissions received over a second path, the first acoustic transmission and other acoustic transmissions originating from audio source signals which include audible content reduce the potential number of other audible acoustic transmissions by using at least one of: a phone number associated with the user's telephone, information related to a user of the telephone, a call-in number used by the user of the telephone, and other information provided by the user of the telephone;
match the first acoustic transmission to a second acoustic transmission received over the second path;
associate a mark contained within the second acoustic transmission with the first acoustic transmission; and
initiate a transaction based on the match and set of decision rules.

32. A method operational on a network operations center, comprising:
identifying an audio transmission by comparing a first audio transmission received from a first path from a phone to one or more audio transmissions received through a second path; reducing the potential number of one or more audio transmissions by using at least one of: a phone number associated with the user's phone, information related to a user of the phone, a call-in number used by the user of the phone, and other information provided by the user of the phone; and matching the first audio transmission to a second audio transmission received over the second path, the second audio transmission being one of the one or more audio transmissions.

33. The method of claim 32 wherein the first audio transmission and one or more audio transmissions originating from audio source signals which include audible content and an inaudible mark.

34. The method of claim 32 wherein the match of the first audio transmission to the second audio transmission includes one of either a simple match, a best match, a time-frequency correlation match, or a feature match.

35. The method of claim 32 further comprising:
executing a transaction based on the identity of the first audio transmission, wherein the transaction is dependent on a set of decision rules stored by the network operations center.

36. The method of claim 32 further comprising:
executing a transaction based on the identity of the first audio transmission, wherein the transaction is dependent on information obtained from a phone that transmits the first audio transmission.

37. The method of claim 32 further comprising:
executing a transaction based on the identity of the first audio transmission, wherein the transaction is dependent on information provided by a user.

38. The method of claim 32 further comprising:
executing a transaction based on the identity of the first audio transmission, wherein the transaction is dependent on information associated with a user.

39. The method of claim 32 further comprising:
executing a transaction based on the identity of the first audio transmission and
sending a communication to a phone that transmits the first audio transmission.

40. The method of claim 32 further comprising:
executing a transaction based on the identity of the first audio transmission,
sending a communication to another device.

41. The method of claim 32 wherein the first audio transmission originates as one of either a radio broadcast content, a television broadcast content, a public address system broadcast content, or a media player content.

42. The method of claim 32 further comprising:
identifying a subset of audio transmissions to which the first audio transmission is compared by using information associated with the sender of the first audio transmission user.

43. The method of claim 32 further comprising:
identifying a subset of audio transmissions to which the first audio transmission is compared by using information associated with the geographic location of the sender of the first audio transmission user.

44. The method of claim 43 wherein such geographic location is one of a global positioning information, area code information, caller identification information, or information defined in a user profile.

45. The method of claim 32 further comprising:
reducing the number of one or more audio transmissions received through the different path by using information related to a user of the phone.

46. A method operational on a network operations server, comprising:
identifying an audio transmission by comparing a first audio transmission received from a first path to one or more audio transmissions received via a second path, the first audio transmission and one or more audio transmissions originating from audio source signals which include audible content and an encoded mark, the first path established via a phone; reducing the potential number of one or more audio transmissions by using at least one of: a phone number associated with the phone, information related to a user of the phone, a call-in number used by the user of the phone, and other information provided by the user of the phone;
decoding an encoded mark in the second audio transmission; and
associating the decoded mark with the first audio transmission.

47. The method of claim 46 further comprising:
associating the decoded mark with a user who provided the first audio transmission.

48. The method of claim 46 further comprising:
initiating a transaction using the decoded mark.

49. The method of claim 46 further comprising:
initiating a transaction using the decoded mark and information associated with the second audio transmission.

50. The method of claim 46 further comprising:
initiating a transaction using the decoded mark and information associated with a network operations center user.

51. The method of claim 46 wherein the encoded mark is associated with a broadcast station of the first audio transmission.

52. The method of claim 46 wherein the encoded mark is associated with individual works within the first audio transmission.

* * * * *